United States Patent [19]
Herbenar

[11] 3,790,195
[45] Feb. 5, 1974

[54] SOCKET JOINT
[75] Inventor: Edward J. Herbenar, Detroit, Mich.
[73] Assignee: TRW Inc., Cleveland, Ohio
[22] Filed: June 27, 1972
[21] Appl. No.: 266,550

[52] U.S. Cl. ............................ 403/124, 403/163
[51] Int. Cl. ............................................ F16c 11/06
[58] Field of Search.. 287/85 A, 90 R, 87, 90 C, 93; 29/149.5 B

[56] References Cited
UNITED STATES PATENTS
| | | | |
|---|---|---|---|
| 3,352,583 | 11/1967 | Patton | 287/93 |
| 3,180,655 | 4/1965 | Gerner | 298/93 X |
| 3,413,023 | 11/1968 | Herbenar | 287/87 |
| 3,430,327 | 3/1969 | Herbenar | 29/243.52 |

FOREIGN PATENTS OR APPLICATIONS
952,646   3/1964   Great Britain .................... 287/90 C Primary Examiner—Andrew V. Kundrat
Attorney, Agent, or Firm—Hill, Sherman, Gross and Simpson

[57] ABSTRACT

A ball seat socket joint primarily for rotational movement with a stud projecting from an internal cavity housing, the stud having a half sphere bulged section received in the housing seated against a spherical face seat adjacent the projecting point of the stud from the housing. The stud has an axial extension beyond the half sphere within the housing; the axial extension is received in a bearing with a resilient member entrapped between the wall of the cavity and the bushing. The opposite end of the housing cavity from the point of projection is closed by a cap which applies a preload to the axial end of the stud within the cavity and to the resilient member.

4 Claims, 6 Drawing Figures

PATENTED FEB 5 1974

3,790,195

1

SOCKET JOINT

BACKGROUND OF THE INVENTION

1. Field of the Invention

This invention relates to joints and more particularly to a projecting stud joint accommodating rotational movement between the stud and the housing in which it is received.

2. Prior Art

Projecting stud joints wherein the stud has a ball end received in a cavity in a housing with a shank projecting from the cavity are well-known to the art. Prior art projecting stud joints generally comprise ball joints with rotational and angular movement or pin joints restricted to rotational movement.

There exists a need in the art for a pin type of joint which is primarily directed to accommodating rotational movement but which can accommodate a degree of angular movement of the stud within the housing.

There further exists a need within the art for a pin joint type of joint where the end of the stud is received in the housing cavity in a manner where there is a constant load applied to the stud to maintain it in perpendicular positioning relative to the socket while at the same time accommodating a limited universal motion.

The above combination has not heretofore been provided in a design that will not unseat when high loads are applied perpendicular to the stud axis. It has further been found difficult in the art to provide an internal loading against the stud which loading has both axial and radial components and which loading continues even in the face of wear of the components.

SUMMARY OF THE INVENTION

This invention overcomes the disadvantages of the art and provides a stem projecting socket joint wherein a stud has a half ball projecting from its circumference at a point along its axis which is received in a housing with a stem portion of the stud projecting from the housing and with the half ball received in a cavity in the housing and contacting a spherical faced seat. Axially of the half ball or half sphere of the stud is an axial stud extension which may have a cylindrical or a tapered surface and which is received in a bearing bushing which accommodates rotational movement between the stud and the bearing.

The bearing is surrounded radially by a resilient ring which in its free state has a tapered portion projecting from one axial end. The cavity in the housing is closed by a cap which presses against the one axial end of the resilient ring and which is seated in the housing with a preload applied thereto to compress the resilient ring to deform the tapered end from its free state. A flange on the end of the bearing remote from the cap prevents the resilient ring from contacting the stud even under compressive loads. The resilient ring then applies both an axial load to the bearing against the flange to force the half sphere portion of the stud against the spherical seat and a radial load against the bearing to maintain the stud in perpendicular relation to the housing cavity.

In the preferred embodiment illustrated, the housing cavity has a cylindrical portion which receives the spherical seat and a tapered portion which receives and constricts the resilient ring. When the cap is attached to the housing to close the cavity, a portion of the housing wall is constricted radially inwardly to hold the cap. At the same time, a portion of the tapered wall of the cavity is formed at a reverse taper to lock the resilient ring in place to maintain the components in the housing in case of failure of the cap.

It is therefore an object of this invention to provide a stud and socket joint wherein the socket is provided in a housing member with the stud having a portion in the socket and a portion projecting therefrom, the stud and housing member accommodating relative rotational movement and limited relative angular movement.

It is a further object of this invention to provide a stud and socket joint wherein the socket is provided as a cavity in a housing with a portion of the stud received in the cavity and a portion projecting from the housing, the stud having a partial spherical surface at one point along its axis seated against a spherical seat in the cavity with an axial projection on the stud within the cavity beyond the partial spherical section, the axial projection received in a bushing, the bushing spaced from the walls of the socket and a resilient ring interposed between the bushing and the walls of the socket.

it is a further object of this invention to provide a socket joint with limited universal motion having a resilient bushing constantly applying a load against a stud projecting from the socket and maintaining a relatively perpendicular positioning of the stud in relation to the socket while accommodating limited angularity between the stud and socket.

it is another and particular object of this invention to provide a stud and socket joint wherein the socket receives a portion of the stud with the stud maintained in perpendicular relation to the socket through the action of a resilient member surrounding a portion of the socket, the resilient member having a deformed end face.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
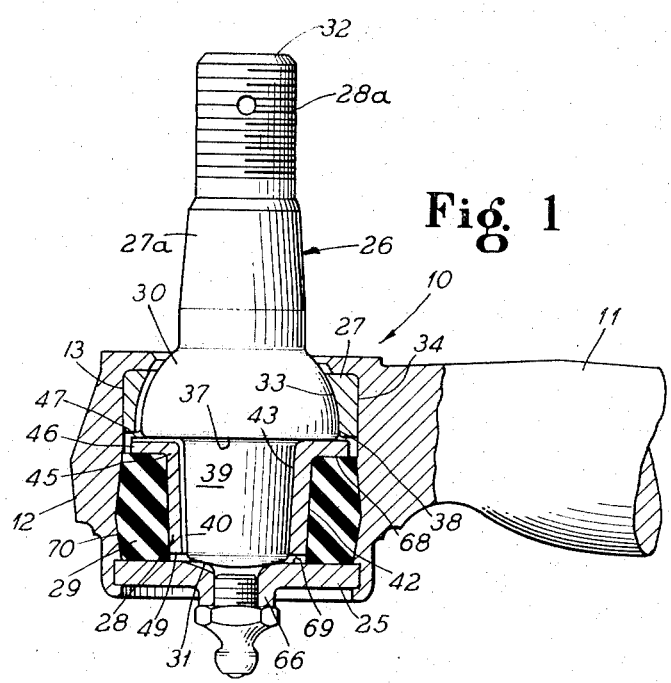
FIG. 1 is a fragmentary cross-sectional view of the joint of this invention.

FIG. 1 illustrates the joint 10 of this invention. The joint includes a linkage member 11 having a housing portion 12 at one end thereof. The housing portion 12 has an opening therethrough defining a cavity 13 which is generally cylindrical.

Figure 6:
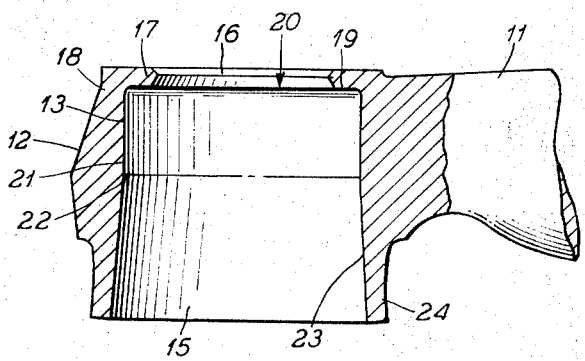
FIG. 6 is a fragmentary cross-sectional view of the housing and socket of the joint of this ring prior to assembly of the components therein.

As best illustrated in FIG. 6, the cavity 13 has a large open end 15 at one axial end of the cavity and a smaller diameter opening 16 at the opposite end, the smaller diameter 16 being defined by an in-turned ledge portion 17 of the walls 18 of the housing providing an in-turned ledge 19 at the bottom 20 of the cavity remote from the large diameter opening 15. The cavity wall 20 has a bottom portion 21 which is cylindrical and which extends from the ledge 19 to a point 22 intermediate the openings 15 and 16. From the point 22 to the opening 15, the wall 20 has a diverging taper 23 which gradually increases the size of the cavity from the point 22 to the opening 15. The housing 12 is attached to the linkage member 11 integrally therewith as a single piece. However, the housing has a wall portion 24 defining the opening 15 which projects beyond the linkage member 11. The wall portion 24 has a thickness dimensioned to allow it to be deformed by a swedging tool for placement of the closure cap 25. A swedging tool capable of being used in the manufacture of the joint 10 of this invention is illustrated and described in my prior patent, U.S. Pat. No. 3,430,327, to E. J. Herbenar, issued Mar. 4, 1969. The teachings of that case are herein incorporated by reference.

The components of the joint 10 include the housing 12, the closure cap 25, a stud 26, a seat 27, a bushing 28, and a resilient ring 29.

The stud 26 has a shank portion 27a projecting from the small-diameter opening 16. The shank portion may terminate in a threaded end 28a adapted to be coupled to another linkage member. The joint illustrated in FIG. 1 is particularly useful in situations requiring relative rotation between the linkage member attached to the shank 27a and the linkage member 11. A particular embodiment where such a joint would be of value is in the idler arm support attachment of an automobile steering linkage, for example, a linkage of the parallelogram type. In such embodiments, the idler arm supports one end of a centerlink member of the linkage, the other end of which is attached to the rotating Pitman arm. As the Pitman arm is turned, the centerlink is moved transversely of the vehicle frame. The idler arm linkage assembly has one portion attached to the frame of the vehicle and another portion attached to the end of the centerlink. As the centerlink moves, a rotation movement must be accommodated between the portion of the idler arm linkage attached to the frame and the portion attached to the centerlink. As the movement is basically rotational, a joint such as the joint 10 can be interposed between the portion of the linkage assembly attached to the vehicle frame and the portion attached to the centerlink.

However, in manufacture and assembly, attachment points and dimensions are not always exact. it is therefore desirable if the joint can accommodate a slight degree of angular misalignment without binding or increasing the torque resistance to rotational movement. Other embodiments may also require a limited angular travel while at the same time incorporating a resistance to such angular travel.

Thus, it is an improvement in the art if the joint can be constructed such that the stud can rotate in the housing cavity while at the same time being free to incorporate a slight degree of universal angularity in the projection of the stud from the housing. This accommodation of angular movement should occur without unseating the stud within the cavity.

it is therefore the general intent of this invention to provide a joint accommodating rotational movement and a degree of angular movement while resisting excess angular movement without substantially increasing the torque resistance to rotational movement, and accommodating a degree of angular movement without unseating.

In order to provide for universal angular movement, the stud 26 has an increased diameter half ball portion 30 intermediate the axial ends 31,32 of the stud. The half ball or half sphere portion 30 is received in the cavity 13 and mates with a partial spherical surface 33 of the seat 27. The seat 27 has an outer diameter 34 dimensioned to mate with the cylindrical wall 21 of the cavity. The inner diameter of the seat 27 is arcuate to form the spherical surface 33 against which the surface of part ball 30 rests.

Figure 2:
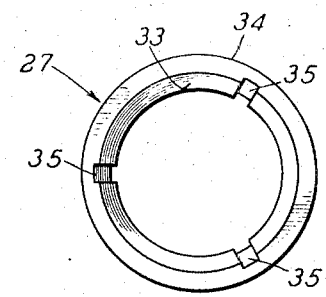
FIG. 2 is a plan view of the spherical seat of the joint of this invention.

As illustrated in FIG. 2, circumferentially spaced grooves 35 may be provided in the inner diameter 33 of the seat 27 to form lubrication grooves to insure lubricating the mating surfaces 30,33.

The large diameter end 37 of the part ball 30 terminates in a radial wall which extends inwardly from the outer diameter 38 of the largest diameter portion of the part ball to an axially extending portion 39 of the stud. The axially extending portion 39 may be slightly tapered, having an outer diameter surface 40 which decreases in circumference from the radial wall 37 to the axial end 31. The axial end 31 is arcuately curved.

The tapered portion 39 is received in the housing 28. The bushing 28 is ring-shaped, and has an axially extending wall 42 which has a taper matching the taper 39 of the stud portion whereby the tapered surface 40 of the portion 39 mates with the inner diameter 43 of the bearing 28.

The bearing 28 has an axial length less than the axial length of the portion 39 of the stud. One axial end 45 of the bearing terminates in an outturned flange 46 which has an axial end surface 47 which rides against the radial face 37 of the half ball portion 30. The other axial end 49 of the bearing terminates in spaced relation to the axial end 31 of the stud.

Figure 3:
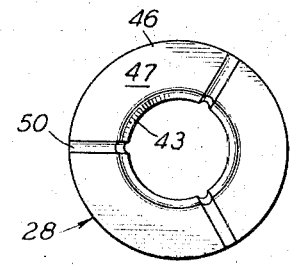
FIG. 3 is an axial plan view of the bushing of the joint of this invention.

As illustrated in FIG. 3, the out-turned flange 46 and the inner diameter face 43 of the bearing 28 have mating grooves 50 therein providing lubrication grooves assuring the lubrication of the mating faces between the radial wall 37 and the flange face 47 and the surface 40 of the stud portion 39 and the inner diameter 43 of the bearing 28.

The bearing outer diameter is less than the diameter of the cavity. The space between the outer diameter of the bearing and the cavity wall is filled with the resilient ring 29.

Figure 4:
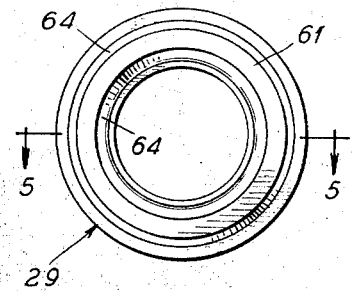
FIG. 4 is an axial plan view of the resilient ring of the joint of this invention.
Figure 5:
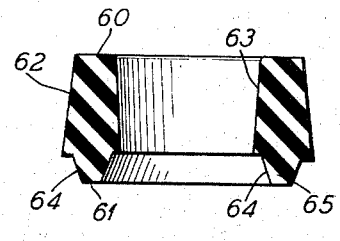
FIG. 5 is a cross-sectional view of the resilient ring taken along the lines V—V of FIG. 4.

The resilient ring 29 best illustrated in FIGS. 4 and 5 consists of a ring mass of resilient material such as rubber, resilient plastic or the like. The ring has axial ends 60 and 61 and outer 62 and inner diameters 63. The inner diameter is tapered to mate with the taper of the bearing and the outer diameter has a reverse taper adapted to mate with the taper of the portion 23 of the cavity 13. In this manner, the ring thickness is less at the forward axial end 60 and increases towards the bottom axial end 61. The forward axial end 60 mates against the flange 46 and the axial end 61 is contacted by the closure cap 25.

The axial end 61, in the preferred embodiment illustrated in FIG. 5, has a reverse taper inner and outer diameter 64 which reduces the thickness of the wall, providing a nose projecting axially of the main body of the resilient ring. The nose portion 65 is compressed by the closure cap. In the free form, the axial length of the resilient ring is greater than the assembled axial length between the underside surface 68 of the flange 46 and the inside surface 69 of the closure cap 25. The bearing is assembled by stacking the components in the cavity including the stud, seat, bearing and resilient ring and thereafter loading the closure cap 25 against the components to provide a preload on the components. The preload is preferably sufficiently great to compress the nose 65 of the resilient ring. When the desired preload is attained, preferably when the central portion 66 of the cap contacts the axial end 31 of the stud the cap 25 applies an axial preload to the stud and, the nose 65 will be compressed from its free state. At that point, the peripheral wall 24 of the cavity is spin-swedged to lock the closure cap in place.

The spin swedge method of closure, as illustrated and disclosed in the aforementioned prior U.S. Pat. No. 3,430,327, locks the components in the housing. By continuing the swedging axially beyond the closure cap, the inner diameter wall 23 of the cavity has its taper reversed as is illustrated at 70 on FIG. 1. This radially constricts and compresses the resilient ring while at the same time providing a peaked outer diameter to the ring. In addition to increasing the compressive force on the ring, this continuing swedge creates an inturned taper to retain the resilient ring and components even if the closure cap 25 were to fail in operation and come loose from the housing. This provides an added degree of safety to the joint.

It can be seen from the above description that the joint described accommodates rotational movement by rotation of the stud in the bearing and seat. A limited degree of angular movement is allowed by means of the spherical contact between the half ball 30 and the seat. The angular movement is resisted by the resilient ring. As the stud angulates in the housing, the bushing will move laterally of the housing in an arcuate manner compressing a portion of the resilient ring. The compressive force of the resilient ring resists movement of the bearing. The stud will not become unseated in the housing due to the spherical mating between the half ball and the seat. The arcuate curvature of the axial end 31 of the stud allows a limited degree of angular movement while maintaining contact between the closure cap 25 and the axial end which cap and end are in slidable bearing relationship.

As wear occurs either between the half ball 30 and the seat or between the tapered surface of the portion 39 and the bearing, the wear will be taken up by expansion of the compressed resilient ring. The resilient ring will take up wear between the half ball 30 and the seat by axial expansion and will take up wear between the bearing and the tapered portion 39 of the stud by radial expansion. The preload applied to the resilient ring during the closure operation assures the maintenance of adequate wear takeup capabilities. Further, the taper of the cavity wall and of the resilient ring provide that expansion of the ring to take up wear will continue to press the ring against the bushing.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. A movable stud joint comprising: a housing, an opening through said housing defined by a wall having axial open ends, a stud having axial ends, an increased diameter section on said stud intermediate the ends, the increased diameter section having a part sphere surface, a seat in said opening having a part spherical face, the stud projecting through one end of the opening into the opening with the increased diameter section received in the opening seated against the seat, a portion of the stud between the increased diameter section and one end of the stud received in the opening, a ring bushing around the portion, the bushing having an outer diameter spaced from the opening wall, a resilient ring entrapped between the bushing and wall, and the resilient ring deformed from its free state and loading against the bushing, the opening closed at the end opposite the one end by a closure cap, the closure cap being loaded against the resilient ring and engaging the one end of the stud in slidable bearing relationship therewith to apply an axial preload thereto, the increased diameter section terminating in a radial face extending radially inwardly to the portion and the bushing terminates at one end in a radial flange mating with the radial face, the resilient ring loaded against the flange and against the bushing outer diameter to apply both an axial and radial load to the stud in conjunction with the preload, the bushing having axially extending lubrication grooves in an inner diameter surface and radial lubrication grooves on the flange opposite the radial face.

2. A movable stud joint comprising: a housing, an opening through said housing defined by a wall having axial open ends, a stud having axial ends, an increased diameter section on said stud intermediate the ends, the increased diameter section having a part sphere surface, a seat in said opening having a part spherical face, the stud projecting through one end of the opening into the opening with the increased diameter section received in the opening seated against the seat, a portion of the stud between the increased diameter section and one end of the stud received in the opening, a bushing around the portion, the bushing hacing an outer diameter spaced from the opening wall, a resilient ring entrapped between the bushing and wall, and the resilient ring deformed from its free state and loading against the bushing, the opening closed at the end opposite the one end by a closure cap, the closure cap being loaded against the resilient ring and engaging the one end of the stud in slidable bearing relationship therewith to apply an axial preload thereto, the increased diameter section terminating in a radial face extending radially inwardly to the portion, the bushing terminating at one end in a radial flange mating with the radial face, the resilient ring loaded against the flange and against the bushing outer diameter to apply both an axial and radial load to the stud in conjunction with the preload, the resilient ring having an end face opposite the flange end having a free state configuration providing an axial length of the resilient ring greater than the axial length between the flange and the closure cap, the free state configuration including an axially projecting ring nose on one axial end of the resilient ring, the nose having a radial thickness less than the radial thickness of adjacent portions of the resilient ring, the resilient ring being deformed at the one end by loading of the closure cap.

3. A movable stud joint comprising: a housing, an opening through said housing defined by a wall having axial open ends, a stud having axial ends, an increased diameter section on said stud intermediate the ends, the increased diameter section having a part sphere surface, a seat in said opening having a part spherical face, the stud projecting through one end of the opening into the opening with the increased diameter section received in the opening seated against the seat, a portion of the stud between the increased diameter section and one end of the stud received in the opening, a ring bushing around the portion, the bushing having an outer diameter from the opening wall, a resilient ring entrapped between the bushing and wall, and the resilient ring deformed from its free state and loading against the bushing, the opening closed at the end opposite the one end by a closure cap, the closure cap loaded against the resilient ring, the increased diameter section terminating in a radial face extending radially inwardly to the portion and the bushing terminating at one end in a radial flange mating with the radial face, the resilient ring loaded against the flange and against the bushing outer diameter to apply both an axial and radial load to the stud, the housing opening having a diameter which decreases for at least a portion of the length of the housing opening toward the end opposite the one end, the decreasing dimension of the opening effective to lock the resilient ring within the opening, the decrease beginning intermediate the ends of the resilient ring.

4. A movable stud joint comprising a stud with a portion thereof projecting from a housing cavity with a portion of the stud received in the cavity, the portion of the stud received in the cavity including a radial extension of said stud, said radial extension having a spherical surface seated against a mating surface associated with the housing to allow rotational and angular movement of the stud with respect to the housing, a portion of the stud beyond the increased portion being received in a bushing, the bushing received in the cavity, and a resilient ring entrapped between a wall of the cavity and the bushing, the resilient ring loading both radially and axially against portions of the bushing to maintain the stud substantially perpendicular to the cavity and to axially load the stud, a wall of the cavity radially outward of the portions of the resilient ring having a radially increasing axial taper, the resilient ring having a mating taper, the tapers decreasing in the direction of the projection of the stud from the housing, the cavity wall taper reversing within the length of the resilient ring whereby the outer diameter surface of the resilient ring has an axial midlength radially extending bulge mating against a conforming cavity wall to lock the resilient ring in the housing cavity.

* * * * *